Figure 4:
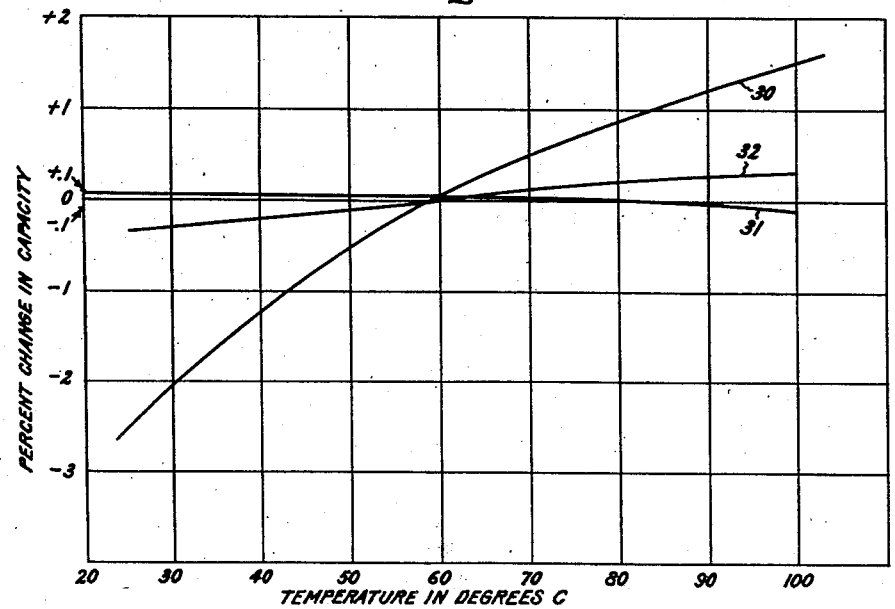

Jan. 14, 1947.  H. F. MILLER ET AL  2,414,320
DIELECTRIC SHEET MATERIAL
Filed Nov. 13, 1942  2 Sheets-Sheet 1
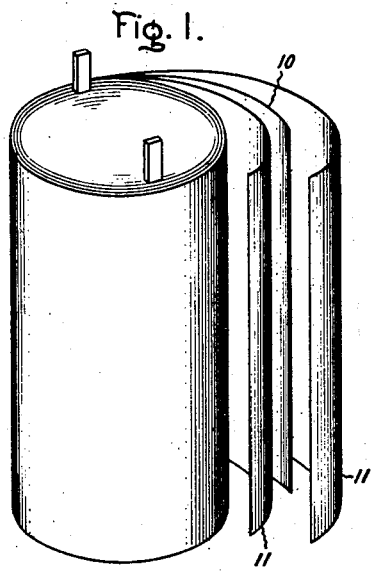
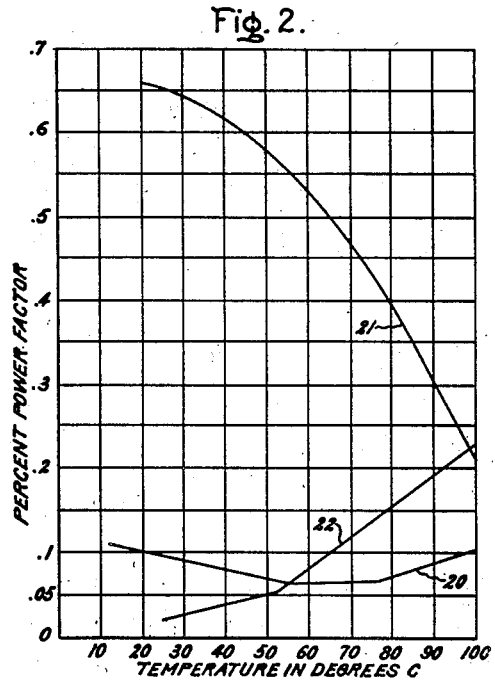
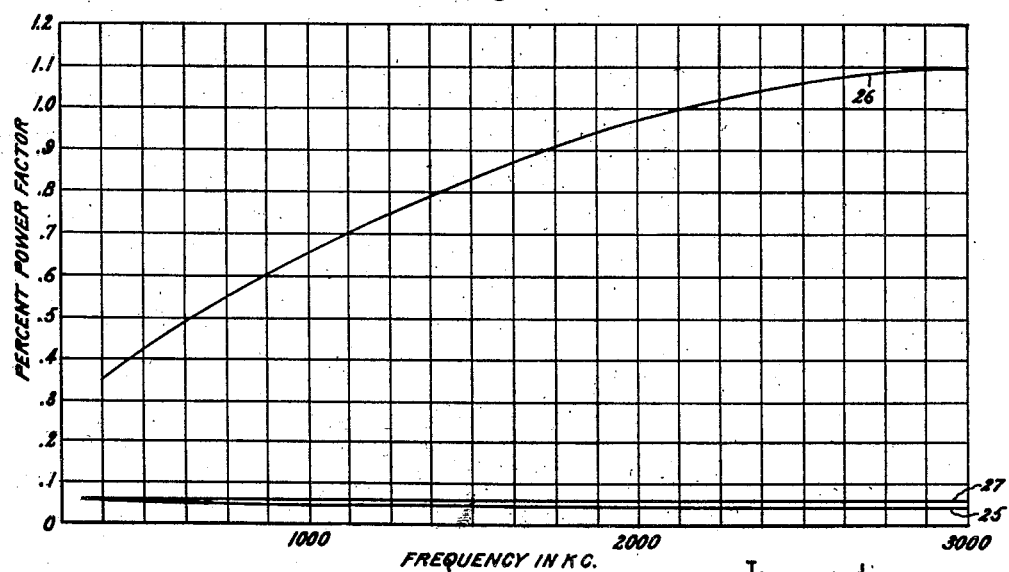
Inventors:
Harry F. Miller,
Levin W. Foster,
by Harry E. Dunham
Their Attorney.

Inventor:
Harry F. Miller,
Levin W. Foster,
by Harry E. Dunham
Their Attorney.

Patented Jan. 14, 1947

2,414,320

UNITED STATES PATENT OFFICE 2,414,320

DIELECTRIC SHEET MATERIAL

Harry F. Miller and Levin W. Foster, Pittsfield, Mass., assignors to General Electric Company, a corporation of New York Application November 13, 1942, Serial No. 465,405

2 Claims. (Cl. 117—155)

Our invention relates to electric capacitors, and to high frequency electric capacitors, and to dielectrics therefor, and to a method of forming the dielectric and capacitor.

Heretofore a customary material for a dielectric between electrodes of a capacitor which has particular application to high frequency circuits has been mica. A condenser properly assembled, with mica as a dielectric, has a power factor in the high frequency range which may be in the vicinity of 0.1 per cent. For many applications, this power factor is lower than need be. Many high frequency condensers can be operated satisfactorily with power factors in the region of 0.50–1.0 per cent, if other critical electrical properties are satisfactory. However, high frequency capacitors employing dielectrics other than mica have not heretofore been available commercially, to our knowledge, in which the dielectric is such that the power factor is less than 1.0 per cent and which has other suitable characteristics as satisfactory capacitance stability and dielectric strength. Capacitors employing ceramics have been employed to some extent but their development is not sufficiently advanced at this time to warrant very extensive applications particularly in high capacity units. Capacitors including paper impregnated with liquids, such as oil or chlorinated diphenyl, have been employed at lower frequencies. However, the power factor of an oil impregnated unit is much too high to be usable in the majority of applications at high frequencies. Furthermore paper readily absorbs moisture which adversely affects its electrical characteristics and in order to help protect the paper it has been customary to employ paper with electrical apparatus immersed in an insulating liquid, such as oil. Attempts have been made to coat paper with resins but this has been confined to materials which have a softening point below the charring point of paper which is about 140 degrees C., so that application thereof will not injure the paper. Also, one of the limiting factors in the use of paper has been that apparatus employing paper should not be continuously operated above about 100 degrees C.

It is therefore an object of our invention to provide an improved electric capacitor which will have a relatively low power factor at high frequencies.

Another object of our invention is to provide an improved electric capacitor which will be simple in construction, economical to manufacture, and efficient in operation.

A further object of our invention is to provide an improved dielectric material for electric capacitors.

A still further object of our invention is to provide an improved insulating material for electrical apparatus including paper coated with a resin having a softening point above the deterioration point of the paper.

A still further object of our invention is to provide an improved paper product for electrical apparatus having a relatively high softening point substantially moisture impervious resin sealing the paper against absorption of moisture.

Figure 5:
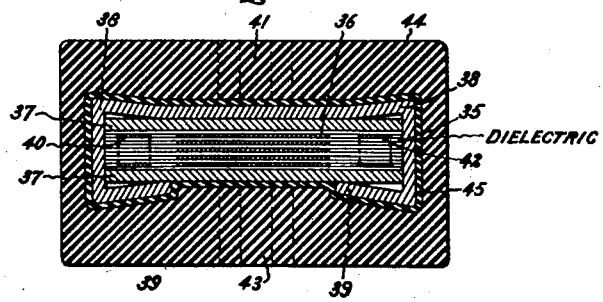

In the drawings:

Fig. 1 illustrates a rolled capacitor which is provided with an embodiment of our invention; Figs. 2, 3, and 4 illustrate curves of electrical characteristics which will be employed in the description of our invention, and Fig. 5 is a sectional side elevation of a capacitor provided with an embodiment of our invention.

As has been stated, mica has been employed for capacitors which have particular application to high frequencies in view of its relatively low power factor characteristics. However, since mica is relatively brittle, such capacitors must be manufactured by stacking sheets of dielectric with electrodes by an essentially manual process. A flexible insulating material, however, such as paper, may be wound between flexible metallic members and thereby simplify the assembly operation. Thus, such wound capacitor constructions including paper as a dielectric, the dielectric being impregnated with some liquid such as oil or chlorinated diphenyl, have been employed where the requirements for power factor are considerably less stringent than those necessary for most high frequency applications.

We have found, however, that a capacitor may be formed having improved mechanical and electrical characteristics when a suitable flexible fibrous insulating material, such as paper, is impregnated or coated with a thermoplastic resinous material of high softening point having the necessary desirable characteristics. A capacitor may be formed of this dielectric by winding with flexible metallic members and thus simplify the commercial assembly of capacitors suitable for high frequency, as well as provide a resulting construction which has the desirable electrical characteristics. Of course, a capacitor having our improved characteristics may also be stacked if desired.

Referring to Fig. 1, we have illustrated a capacitor including a rolled flexible dielectric sheet material 10 between sheets of flexible metallic conducting material 11, such as aluminum or lead. The dielectric sheet material includes paper suitably impregnated or coated with a thermoplastic high softening point low power factor resinous material, such as polyvinylcarbazole, copolymers of vinylcarbazole and styrene, or polyvinylcarbazole combined with suitable cross-linking agents having monomers containing two non-conjugated carbon-to-carbon double bonds, such as diallyl phthalate, and glycol dimethacrylate. A suitable compound is about 95 per cent N-vinylcarbazole and about 5 per cent cross-linking agent, the resulting resin having a very low power factor. A flexible porous insulating material with a resin including about 95 per cent vinylcarbazole and about 5 per cent cross-linking agent also provides an improved dielectric with capacitors. A porous flexible solid dielectric may be impregnated or coated with the resin in any suitable manner, such as with the melted monomer and then polymerizing the resin. The vinylcarbazole is a definite crystalline non-volatile organic compound having a sharp melting point, about 66 degrees C., so that we can impregnate or coat with a substantially polymer-free material. Impregnating with a material having these characteristics has the advantage that polymerization takes place without loss of material as compared with polymerization with volatile monomeric materials as styrene or methyl methacrylate. Also, the flexible solid dielectric may be impregnated with the melted monomeric vinylcarbazole and a catalyst, such as benzoyl peroxide, followed by polymerization. When the flexible solid dielectric material is impregnated or coated with the polymer, the polymer may be dissolved in a suitable solvent, such as benzene or toluene. The material may then be heated so as to drive off the solvent. Also, the impregnated or coated material may be then pressed so as to flow the resin and fill up all voids.

In the application of cellulose products, such as paper to electrical apparatus it is well known that suitable impregnants or oils must be employed to keep the paper from absorbing deleterious impurities such as moisture. The customary materials for coating and impregnating paper have usually included tars, oils, and synthetic resins, each of which may be transformed into its final state on the paper without substantially raising the temperature thereof above the charring point of the paper, which is around 140 degrees C. We have found, however, that we may impregnate or coat a cellulose paper with a relatively high softening point material and convert the material to its final state above the charring point of the paper. For example, when coating the paper with a vinylcarbazole polymer dissolved in a suitable solvent the paper may be heated in any suitable manner such as by running through an oven which is maintained at a temperature sufficient to remove the solvent, this temperature being approximately 190 to 200 degrees C. with the particular solvent employed. Even though the paper is maintained in this high temperature for about 3 minutes we have found no evidence of burning of the paper. After removing substantially all the solvent the coated paper may then be pressed between hot rolls or plates which are maintained at approximately 200 to 230 degrees C., which is about the softening point of the polymer. This pressing causes the resin to flow evenly, and a plurality of coated sheets may be formed into a laminated product by this pressing operation. Furthermore, the paper may be impregnated or coated in that condition of dryness when its power factor is substantially a minimum, and the application of the resin will substantially minimize the further absorption of moisture by the paper. Papers so coated and pressed have been maintained in an oven at temperatures of 140 to 170 degrees C. for periods of from 50 to 100 hours without altering adversely the electrical characteristics of the finished capacitor with which the paper was employed. It appears that the application of the relatively high softening point resin in some manner prevents the oxygen from coming in contact with the cellulose and thereby minimizes any charring even though the temperature thereof is maintained above the charring point of the unprotected cellulosic material. Thus by coating a cellulosic material in the manner described above we have obtained a product in which not only the absorption of moisture by the paper is minimized but the resulting product may be operated at a higher temperature than has been customary for apparatus employing the usual cellulosic material. After water immersion tests it was determined that our improved capacitors including paper coated with polyvinylcarbazole had at least as good and in some cases much better leakage resistance than did similar mica capacitors. Both types of capacitors which were tested in this manner had a molded casing of the type shown in Fig. 5.

In the formation of low frequency capacitors which include paper wound between conducting electrodes it is usually customary to employ between each pair of electrodes three sheets of paper each of which is approximately 0.35 to 0.5 mil in thickness. Thus, the actual thickness of the paper between electrodes will be a little over 1 mil thick. In the formation of our improved capacitors we may employ similar paper which after coating with our improved resin will increase the thickness of each of the films about 0.8 mil or about 0.4 mil on each side. Also, the paper may be impregnated in addition to coating so that the build will be less than when only coating is accomplished. When employing more than one sheet of our improved dielectric between electrodes instead of merely assembling a plurality of separate sheets, the sheets may be suitably formed into a laminated product by pressing. Thus as the paper sheets are made, they may be coated or impregnated and then any suitable number pressed together to form an integral laminated product. The sheet material may be either directly wound into capacitor constructions or wound into rolls until needed as the resin coating substantially seals the porous dielectric so as to minimize damage thereto by such deleterious impurities, as moisture.

Capacitors made according to our invention have electrical and mechanical characteristics which make them particularly adapted to high frequency application. For instance, in Fig. 2 we have illustrated the change in power factor with change in temperature at about 150 kilocycles for capacitors having various materials. Curve 20 indicates the characteristics for capacitors having as a dielectric three mil glass cloth coated with polyvinylcarbazole, while curve 21 represents a capacitor having a dielectric including paper coated with polyvinylcarbazole. Curve 22 illustrates the characteristics of a commercially available capacitor having mica as a dielectric. A curve for a capacitor including paper impregnated with oil has not been included since power factor varies over a range between about two to four per cent between 50 and 430 kilocycles.

It will be noted that capacitors including paper and polyvinylcarbazole having a per cent power factor that decreases with increasing temperature, while mica capacitors have a per cent power factor that increases with increasing temperature. Also, we have noticed that the material polyvinylcarbazole itself has a per cent power factor characteristic which tends to increase with increasing temperature. Thus, when our improved capacitor having paper and polyvinylcarbazole is connected with an inductance in a high frequency circuit the characteristic of our improved capacitor will compensate that of the inductance which usually has a positive power factor temperature characteristic. Furthermore, since our improved capacitors including paper and polyvinylcarbazole have a negative power factor characteristic the dielectric will not run away with increasing temperature within its operating range, while with mica capacitors it is known that power factor tends to increase with increasing applied voltage, thus causing increased heating which in turn further raises the power factor. We have found, however, that below corona starting voltages capacitors with paper and polyvinylcarbazole as a dielectric show a relatively constant power factor with changes in applied voltage within operating range. Furthermore, the corona starting voltage of our improved capacitors has been shown to be at least about twice that of commercially available mica capacitors.

In Fig. 3 we have illustrated the change in power factor with change in frequency, the curve 25 representing the characteristics of a capacitor having glass cloth impregnated with polyvinylcarbazole, and curve 26 representing the characteristics of a capacitor having paper impregnated with polyvinylcarbazole. For comparison with the characteristics of our improved capacitors we have included the per cent factor-frequency characteristic as curve 27 of a commercially available capacitor having mica as a dielectric. The characteristics of paper and oil capacitors are not included in Fig. 3 since they are in the range of about three to seven per cent even up to only one megacycle.

Once a high frequency capacitor is put into a tuned circuit, it is important that the capacitance of the condenser does not change with changing temperature enough to put the circuit out of resonance. For instance, oil-paper and chlorinated diphenyl-paper combinations cannot be used for such high frequency applications because the capacity will change ten to twenty-five per cent over an eighty degree C. range. However, the maximum capacitance change which has been observed on our improved capacitors including polyvinylcarbazole-paper has been about four per cent from 25 degrees C. to 100 degrees C. Thus, in Fig. 4 we have illustrated the characteristics of change in per cent capacity for changes in temperature of about 338 kilocycles. In Fig. 4, curve 30 represents the change in per cent capacity with temperature for capacitors having paper coated with polyvinylcarbazole, while curve 31 represents the change in capacity with change in temperature for capacitors having glass cloth impregnated with polyvinylcarbazole. The characteristics of a capacitor having paper impregnated with oil or chlorinated diphenyl are not included in this figure in view of the extremely wide range of change in capacity with change in temperature which may be obtained with capacitors formed in this manner. The characteristics of a commercially available mica capacitor is given by curve 32.

The dielectric sheet containing polyvinylcarbazole may be prepared in several different ways. When impregnation of paper with resin is desired, a quick saturating paper with a low lignin content may be used. When a saturating paper less than one mil in thickness is employed, or when the contact time between the resin solution and a relatively slow saturating paper is sufficient to allow soaking to occur, then troublesome wrinkling of the finished sheet may occur. This wrinkling causes voids in the assembled condenser, with consequent low voltage breakdowns.

In order to prevent wrinkling a unit may be formed by rolling or stacking with paper and metal electrodes and then vacuum impregnating the unit with the melted monomeric N-vinylcarbazole, followed by polymerization.

Another way of minimizing wrinkles is to coat the paper with polyvinylcarbazole resin with a solvent removal rate such that it does not have time to soak in. This can be done most efficaciously with high calendered kraft papers. As has been stated, sometimes it is desirable to press several such coated papers together above the softening point of the resin to form a single laminated void-free sheet easy to handle in manufacturing operations. This helps to remove wrinkles.

Another way of minimizing wrinkles is to add what we wish to term an "anti-wrinkling" agent to the resin that slows up the impregnation of the paper and yet which will not affect adversely the electrical properties of the finished sheet. Any suitable material may be employed and certain liquids such as dihydronaphthalene dimer, trichlorobenzene, and the mixture of diphenyl and diphenyl oxide, known as Dowtherm A, serve effectively as retarders and anti-wrinkling agents, and yet do not appear to raise the power factor or lower the dielectric strength of the sheet.

In Fig. 5 we have illustrated a capacitor construction including stacked sheets 35 of our improved dielectric material with intervening electrodes of metal foil 36. Plates of suitable metallic material 37 are then placed on either side of the stacked dielectric and metal foil sheets and a metallic clip 38 is placed around the stacked sheet with ends 39 bent onto the adjacent metallic metal member 37 so as to relatively tightly hold the stacked unit together. A copper clip 40 is provided for connecting half the metal sheets to one terminal 41 while a similar clip 42 is provided for connecting the other metal sheets to another terminal 43. Any suitable casing or covering may then be placed around the unit and in the construction illustrated in Fig. 5 we have shown a molded casing construction 44 of any suitable material, such as a phenolic condensation product. In the manufacture of such relatively small units commercially it may be that the stacked units may be left in a relatively humid atmosphere before they are surrounded by a plastic casing. In addition to the protection of each dielectric sheet by the resin coating protection of the unit from moisture may be obtained by dipping the stacked units including the binding clip 38 in hot vinylcarbazole monomer so that the unit is completely surrounded by the liquid, followed by polymerization of the liquid to a polymer. Such a coating around the stacked unit is indicated by the numeral 45. A solid block is thus obtained with a capacitor unit in the center and an integral structure is thereby provided with a protective casing so as to further protect the unit from the possibility of penetration by moisture. If enough liquid monomer is used, the cast block may be of sufficient size so that the surrounding plastic casing 44 is not needed. Furthermore the surrounding coating 45 of the resinous material which is similar to that which is included in the dielectric between the plates of the condenser adds strength and rigidity to the unit so that the possibility of tearing the dielectric sheets during subsequent manufacturing operations such as molding of the casing 44 therearound is substantially minimized. Furthermore, when surrounding the unit with a coating 45 which is composed of the polyvinylcarbazole the possibility of contamination of the unit with materials having poorer electrical properties is also minimized.

Instead of molding a casing such as 44 around the stacked unit when there is a possibility that the pressure employed to provide the molded casing will tear the dielectric, any suitable casting material, such as glycol maleate and diallyl phthalate or mixtures of the two may be cast around the stacked unit. Also fillers may be employed in the casing which have stable characteristics, good resistance to moisture, and which do not have a detrimental effect on the unit assembly.

Although we have shown and described particular embodiments of our invention, we do not desire to be limited to the particular embodiments described, and we intend in the appended claims to cover all modifications which do not depart from the spirit and scope of our invention.

What we claim as new and desire to secure by Letters Patent of the United States is:

1. A dielectric sheet material consisting of paper impregnated with copolymerized mixture of 95 per cent N-vinylcarbazole and 5 per cent diallylphthalate.

2. A dielectric including paper having thereon a thermoplastic resinous material including polyvinylcarbazole, and an organic material including a mixture of diphenyl and diphenyloxide added to the resin so as to substantially prevent wrinkling of the paper by the resin.

HARRY F. MILLER.
LEVIN W. FOSTER.